INVENTOR.
John T. Montgomery
BY
A. Schapp
ATTORNEY

Patented Aug. 19, 1952

2,607,376

UNITED STATES PATENT OFFICE 2,607,376

PIPE MACHINING TOOL

John T. Montgomery, San Francisco, Calif., assignor to Pilot Manufacturing Company, San Francisco, Calif., a copartnership Application April 16, 1949, Serial No. 87,941

8 Claims. (Cl. 144—205)

The present invention relates to improvements in a pipe machining tool and has particular reference to a tool for machining a tapered or cylindrical finish on the end of asbestos cement pipe and for facing the end of the pipe.

My tool comprises in its principal features a shaft having means for anchoring the same to the inside of the pipe and a cutter head revolvable on the shaft, and the principal object of the invention is to provide an anchoring means for the shaft which automatically centers the shaft with respect to the pipe.

A further object of the invention is to provide an anchoring means which will readily compensate for slight inaccuracies in the inner face of the pipe and will bring the shaft substantially into the median center which may be defined as an axis closest to being the common axis of all irregularities.

It is further proposed to provide an anchoring means which may be adjusted to accommodate a wide range of sizes and will support itself in a curved segment of the pipe.

It is further proposed in the present invention to provide a special cutter head which will automatically bring the cutter into the correct position with respect to the pipe, regardless of the size of the latter.

And finally, it is proposed to provide a tool of the character described that is relatively simple in construction and may be applied to the pipe with little effort.

Further objects and advantages of my invention will appear as the specification proceeds, and the novel features of my invention will be fully defined in the claims attached hereto.

Figure 1:
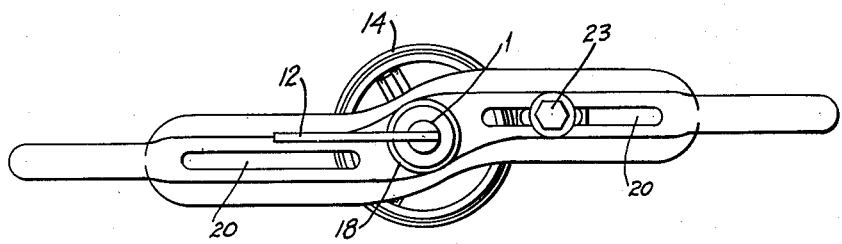
Figure 2:
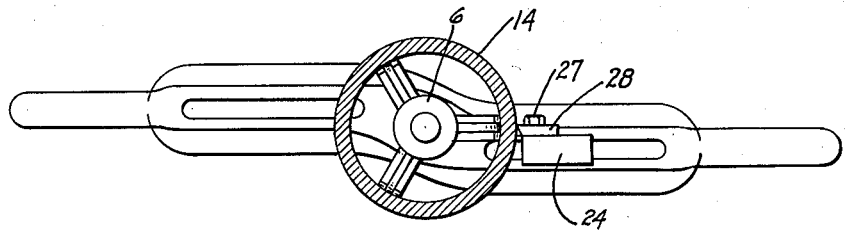

The preferred form of my invention is illustrated in the accompanying drawing, in which:

Figure 1 shows an outer end view of the tool as applied to a pipe,

Figure 2, an inner end view of the tool, and

Figure 3:
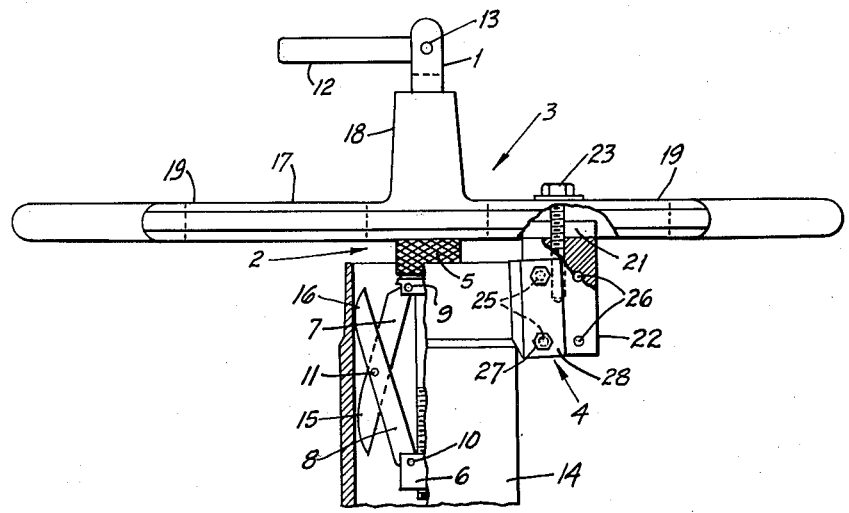

Figure 3, a side view of the tool as applied to the pipe, certain portions being shown in section.

While I have shown only the preferred form of my invention, I wish to have it understood that various changes and modifications may be made within the scope of the claims attached hereto without departing from the spirit of the invention.

Referring to the drawing in detail, my tool comprises in its principal features a shaft 1 having anchoring means 2 attached thereto, and a cutter head 3 carrying a cutter 4. The tool illustrated was designed for pipes ranging from 3 inches to 8 inches in diameter, and the shaft 1 may be approximately three-quarters of an inch in diameter and should be of sufficient length to allow of approximately one-half for carrying the anchoring means within the pipe while the other half projects from the end of the pipe to carry the cutter head.

The anchoring means comprises in its principal features a bearing 5 with a knurled outer face in which the shaft revolves but is held against endwise movement, a nut 6 threaded upon the inner end of the shaft, and cooperative fingers 7 and 8 pivoted to the bearing and the nut as at 9 and 10 and to each other intermediate their length as at 11.

I preferably provide three radial sets of fingers spaced 120° apart, each set comprising a middle finger 7 attached to the bearing and two outer fingers 8 straddling the middle finger.

The outer end of the shaft has a crank 12 pivoted thereto as at 13, the crank being swingable in a slot in the shaft between the rectangular position shown in Figure 3 and a position of alinement with the shaft.

It will be noticed that with the tool in the position shown in Figure 3 as mounted in the pipe 14 the fingers may be spread and contracted by a turning movement of the shaft with the bearing 5 held stationary which causes the nut 6 to move toward or away from the bearing depending upon the direction of rotation.

It will be noted that the extreme ends of the fingers may thus be brought into anchoring contact with the inner face of the pipe at nine different points, each set having three contact points and the three sets being spaced circumferentially by 120°.

It will also be noted that the pivots 9 and 10 of the fingers are arranged relatively close to the inner edges of the latter, while the pivot 11 of each set is relatively close to the outer edges of the fingers. This prevents the pivot 11 from ever reaching a dead center position with respect to the pivots 9 and 10 and facilitates initial opening of the fingers from their most collapsed position adjacent the shaft.

While the fingers have been described as moving in radial planes, it will be noted that only the middle finger strictly speaking moves in the radial plane of the axis of the shaft, while the two outer fingers move parallel to the middle finger. Due to the fact that the inner surface of the pipe is curved it is apparent that if the contact faces of the fingers moved exactly in straight planes paralleling the axis of the shaft, the double fingers would strike the inner face of the pipe ahead of the single finger and would prevent the latter from making proper anchoring contact.

This feature is negligible where the tool is used in connection with a large pipe in which the circumference approaches a straight line.

I find, however, that where the pipe has a comparatively small diameter some compensation should be made in the contact faces of the fingers and with this object in view I have developed the contact face 15 of each outer finger somewhat different from the contact face 16 of each inner finger.

In their extreme ends which would constitute the contact faces in a large pipe the curvatures are drawn to the same arc because no compensation for the pipe curvature is needed. However, as the contact faces recede from the extreme ends, as in the case where the device is used in connection with a pipe of smaller diameter and the pipe curvature becomes more pronounced, the double fingers are drawn to a curve of progressively increasing radius as shown in Figure 3. This results in the contact points of the double fingers receding more quickly than those of the single fingers, on a collapsing movement.

The cutter head 3 comprises a handle 17 consisting of a hub 18 revolvable on the shaft 1 and two arms 19 projecting from the hub in opposite directions.

As will be clearly seen from Figures 1 and 2, the two arms are offset with respect to a diametrical line, and each of the arms has an elongated slot 20. Each of the slots is adapted to slidably receive a tongue 21 projecting from the cutter mounting 22, and the latter may be secured in any adjusted position by means of a bolt 23 passing through the tongue 21 into the body of the cutter mounting.

The cutter mounting is in the form of a rectangular block 24 provided with suitable holes 25 and 26 adapted to receive suitable bolts 27 for securing the cutter blade 28 upon the cutter mounting. It will be noted that the two holes 25 are slightly disaligned to bring the cutting edge of the blade into inclined position with respect to the edge of the blade mounting for effecting a tapered cut on the end of the pipe, while the holes 26 are alined so that when the blade is secured by means of these two holes, a cylindrical cut will be obtained. It is apparent that the mounting block is reversible in its slot and may readily be transferred to the slot in the other arm.

The manner of using the invention will be readily understood from the foregoing description. When the end of a pipe is to be trimmed the operator will usually first set the shaft with respect to the pipe. This he can do by introducing the anchoring means into the pipe, with the bearing projecting sufficiently far to form a hand-hold. He then turns the shaft by means of the crank 12 until the fingers contact the inner face of the pipe and firmly anchor the shaft. Next he will swing the crank 12 into a position of alinement with the shaft 1 and slide the handle over the crank upon the shaft.

Having previously set the cutter at the proper distance from the center of rotation, he then turns the handle, crowding the same towards the pipe until the desired trim has been obtained. The cutter head may then be removed by again sliding the same over the alined crank 12, and the anchoring means may be released by a turning movement of the shaft 1, with the bearing 5 held against rotary motion.

It will be noted that the anchoring means is particularly efficient and readily adapts itself to small inaccuracies in the shape of the pipe in view of the fact that it provides nine different points of contact, three at one end and six at the other end, and also makes provision for the pipe curvatures by the correct shaping of the contact curves at 15 and 16.

The handles are offset with respect to a diameter to bring each of the arms slightly behind the diameter in its rotary course and to allow the blade to be properly positioned, slightly ahead of the diameter, as clearly shown in Figure 2, to provide the proper rake.

I claim:

1. In a pipe machining tool of the character described, a bearing member, a shaft revolvable therein and held against endwise motion with respect thereto, a nut member threaded on one end of the shaft, radial sets of cooperative fingers pivoted in the two members respectively and having free ends, and pivots connecting the fingers of each set intermediate their lengths, whereby the free ends of the fingers are made to move toward or away from the shaft in response to a turning movement of the latter in its bearing member.

2. In a pipe machining tool of the character described, a bearing member, a shaft revolvable therein and held against endwise motion with respect thereto, a nut member threaded on one end of the shaft, radial sets of cooperative fingers pivoted in the said members respectively and having free ends, and pivots connecting the fingers of each set intermediate their lengths, whereby the free ends of the fingers may be made to expand against the inside face of a pipe surrounding the same when the shaft is turned in its bearing member the free ends of the fingers having longitudinally curved contact faces.

3. In a pipe machining tool of the character described, a bearing member, a shaft revolvable therein and held against endwise motion with respect thereto, a nut member threaded on one end of the shaft, radial sets of cooperative fingers pivoted in the said members respectively and having free ends, and pivots connecting the fingers of each set intermediate their lengths, whereby the free ends of the fingers may be made to expand against the inside face of a pipe surrounding the same when the shaft is turned in its bearing member the free ends of the fingers having longitudinally curved contact faces, and each set of fingers comprising one finger pivoted to one of said members and two fingers pivoted to the other member and straddling the former finger.

4. In a pipe machining tool of the character described, a bearing member, a shaft revolvable therein and held against endwise motion with respect thereto, a nut member threaded on one end of the shaft, radial sets of cooperative straight fingers pivoted in the said members respectively and having free ends, and pivots connecting the fingers of each set intermediate their lengths, whereby the free ends of the fingers may be made to expand against the inside face of a pipe surrounding the same when the shaft is turned in its bearing member and may be contracted to a position immediately adjacent the shaft and in alinement with each other, the connecting pivot being off-set with respect to the finger anchoring pivots when the fingers are alined so as to prevent locking of the fingers in dead center position.

5. In a pipe machining tool of the character described, a bearing member, a shaft revolvable therein and held against endwise motion with respect thereto, a nut member threaded on one end of the shaft, radial sets of straight cooperative fingers pivoted in the two members respectively and having free ends, the fingers being pivoted to the two members immediately adjacent the shaft, and pivots connecting the fingers of each set intermediate their lengths, whereby the free ends of the fingers are made to move toward or away from the shaft in response to a turning movement of the latter, the fingers being dimensioned for accommodation between the two bearing members immediately adjacent the shaft and in alined relation with each other in the extreme movement of the free ends toward the shaft.

6. In a pipe machining tool of the character described, a bearing member, a shaft revolvable therein and held against endwise motion with respect thereto, a nut member threaded on one end of the shaft, radial sets of straight cooperative fingers pivoted in the two members respectively and having free ends, the fingers being pivoted to the two members immediately adjacent the shaft, and pivots connecting the fingers of each set intermediate their lengths, whereby the free ends of the fingers are made to move toward or away from the shaft in response to a turning movement of the latter, the fingers being dimensioned for accommodation between the two bearing members immediately adjacent the shaft and in alined relation with each other in the extreme movement of the free ends toward the shaft, and the connecting pivot being off-set with respect to the finger-anchoring pivots when the fingers are alined adjacent the shaft so as to prevent locking of the fingers in dead center position.

7. In a pipe machining tool of the character described, a pair of bearing members, a shaft revolvable therein, cooperative means on the shaft and at least one of the bearing members for effecting relative movement of the bearing members toward and away from each other when the shaft is rotated, radial sets of straight cooperative fingers pivoted in the two members respectively and having free ends, the fingers being pivoted to the two members immediately adjacent the shaft, and pivots connecting the fingers of each set intermediate their lengths, whereby the free ends of the fingers are made to move toward or away from the shaft in response to a turning movement of the latter, the fingers being dimensioned for accommodation between the two bearing members immediately adjacent the shaft and in alined relation with each other in the extreme movement of the free ends toward the shaft.

8. In a pipe machining tool of the character described, a pair of bearing members, a shaft revolvable therein, cooperative means on the shaft and at least one of the bearing members for effecting relative movement of the bearing members toward and away from each other when the shaft is rotated, radial sets of straight cooperative fingers pivoted in the two members respectively and having free ends, the fingers being pivoted to the two members immediately adjacent the shaft, and pivots connecting the fingers of each set intermediate their lengths, whereby the free ends of the fingers are made to move toward or away from the shaft in response to a turning movement of the latter, the fingers being dimensioned for accommodation between the two bearing members immediately adjacent the shaft and in alined relation with each other in the extreme movement of the free ends toward the shaft, and the connecting pivot being off-set with respect to the finger-anchoring pivots when the fingers are alined adjacent the shaft so as to prevent locking of the fingers in dead center position.

JOHN T. MONTGOMERY.

REFERENCES CITED

The following references are of record in the file of this patent:

UNITED STATES PATENTS

| Number | Name | Date |
| --- | --- | --- |
| 764,341 | Bond | July 5, 1904 |
| 1,155,337 | Burns | Oct. 5, 1915 |
| 1,823,959 | Steinmayer | Sept. 22, 1931 |
| 1,985,757 | Abramsen | Dec. 25, 1934 |
| 1,993,561 | Meglitz | Mar. 5, 1935 |
| 2,080,906 | Boyer | May 18, 1937 |